United States Patent [19]

Peddycoart

[11] Patent Number: 5,548,920
[45] Date of Patent: Aug. 27, 1996

[54] FISHING LURE

[76] Inventor: Mark J. Peddycoart, 7824 Tessman Dr. North, Brooklyn Park, Minn. 55455

[21] Appl. No.: 429,347

[22] Filed: Apr. 26, 1995

[51] Int. Cl.⁶ .................................................. A01K 83/06
[52] U.S. Cl. ........................................... 43/44.2; 43/42.24
[58] Field of Search ............................... 43/44.2, 44.8, 43/42.24

[56] References Cited

U.S. PATENT DOCUMENTS

| | | | |
|---|---|---|---|
| 564,517 | 7/1896 | Hastings | 43/44.8 |
| 1,791,723 | 2/1931 | Hampton. | |
| 2,237,389 | 4/1941 | Ludwig. | |
| 2,476,126 | 7/1949 | Weiss | 43/44.2 |
| 2,597,679 | 5/1952 | Schwarzer. | |
| 2,651,133 | 9/1953 | Sharps. | |
| 2,755,593 | 7/1956 | Thurman | 43/44.2 |
| 2,797,522 | 7/1957 | Friedrich. | |
| 2,871,611 | 2/1959 | Shepard. | |
| 2,938,296 | 5/1960 | Kracht. | |
| 3,435,553 | 4/1969 | Conley. | |
| 3,494,066 | 2/1970 | Lawter. | |
| 3,834,060 | 9/1974 | Wagenknecht. | |
| 4,422,260 | 12/1983 | Perrick. | |
| 4,989,361 | 2/1991 | Peterson | 43/44.2 |
| 5,386,661 | 2/1995 | Davis | 43/44.2 |

*Primary Examiner*—Jack W. Lavinder
*Assistant Examiner*—Allyson Abrams
*Attorney, Agent, or Firm*—James W. Miller

[57] ABSTRACT

A fishing lure comprises an elongated main shank made of a thin wire having a hook suspended from one end and a line attachment eyelet located at the other end. A plurality of beads and a spoon are slidably and loosely received on the main shank to be located adjacent the line attachment eyelet during use. A bait holding shank is attached to the main shank adjacent the hook, but slightly spaced therefrom, and faces forwardly towards the line attachment eyelet. The bait holding shank is resilient and in an untensioned state has the free outer end thereof spaced away from the main shank. The bait holding shank can be bent inwardly against the bias therein to allow the free end of the bait holding shank to be received in the central bore of the innermost bead, thereby conveniently securing the bait holding shank to the main shank after the bait has been installed on the bait holding shank.

16 Claims, 2 Drawing Sheets

FISHING LURE

TECHNICAL FIELD

This invention relates to a fishing lure that utilizes a worm type bait and, more particularly, to a lure having a means for easily and quickly installing the bait without having to disassemble the lure or remove any parts therefrom.

BACKGROUND OF THE INVENTION

Fishing lures of various types are known which include a wire shank forming the body of the lure. The shank includes a hook at one end for hooking the fish and an eyelet at the other end for attaching the lure to the line. However, if the bait is to be placed onto the shank itself, the lure would have to be partially disassembled in order to do so to have access to the shank to allow the bait to be threaded or slid onto the shank. If the bait is artificial in nature, e.g. a plastic or rubber worm, the bait can be placed on the shank during the initial manufacture of the lure. However, if the bait is lost from the lure during use, because it is taken by a fish without the fish being hooked, there is no easy way to replace the bait without disassembling at least one end of the lure.

This problem has been previously recognized in fishing lures, and one solution that has been proposed is to use a separate bait holding shank, carried on the main shank, for carrying or holding the bait. The bait can be threaded onto the bait holding shank which is then pivoted relative to the main shank to engage the bait holding shank with some type of locking member to allow the bait holding shank to be held in place. If the bait is lost, a new one can be installed by releasing the bait holding shank from the locking member and by threading the new bait onto the free end of the bait holding shank. There is no need to thread the bait onto the main shank in this type of lure. U.S. Pat. No. 1,791,723 to Hampton, U.S. Pat. No. 2,237,389 to Ludwig and U.S. Pat. No. 2,871,611 to Shepard show devices of this general type.

The lures shown in such previous patents all have various disadvantages. For one thing, the locking member typically comprises a separate structural part, i.e. a hook or latch, that has to be added to and fixedly secured to the main shank. Thus, the costs for manufacturing the lure are increased since it adds a separate part and labor is required to glue, weld or solder the locking member to the main shank. Moreover, such locking members form or have various sharp edges or slots that can serve as places on which weeds, reeds or other underwater obstructions might catch. Thus, such lures are somewhat more prone to be fouled and lost during use.

Moreover, in such known lures, the rest of the lure is not designed to particularly attract fish or to integrate the bait holding shank into the lure with a particular bait in mind. For example, the locking member for the bait holding shank is demonstrably a mechanical member or element that does not resemble a natural portion of the bait that is intended for use on the bait holding shank. Moreover, the bait holding shank does not attempt to hold the bait in any special configuration.

SUMMARY OF THE INVENTION

It is an aspect of this invention to provide a fishing lure having a means for easily and quickly installing the bait without having to disassemble the lure or remove any parts therefrom, which lure is easy to manufacture and reliable during use while being effective for catching fish.

This and other aspects of the invention are provided in a fishing lure which comprises a main wire shank having a hook suspended from a first end thereof and a line attachment means at the other end thereof. At least one fish attracting element(s) is carried on the main shank adjacent the line attachment means. A bait holding wire shank has one end attached to the main shank with the bait holding shank being flexible relative to the main shank and extending away from the main shank to terminate in a free end. A locking means is provided on the main shank adjacent the bait attracting element for releasably securing the free end of the bait holding shank. The bait holding shank is released from the locking means to allow the bait to be threaded or slid onto the bait holding shank and thereafter can be flexed downwardly relative to the main shank to engage the free end of the bait holding shank with the locking means.

BRIEF DESCRIPTION OF THE DRAWINGS

This invention will be described more completely hereafter in the Detailed Description, when taken in conjunction with the following drawings, in which like reference numerals refer to like elements throughout.

DETAILED DESCRIPTION

Figure 1:
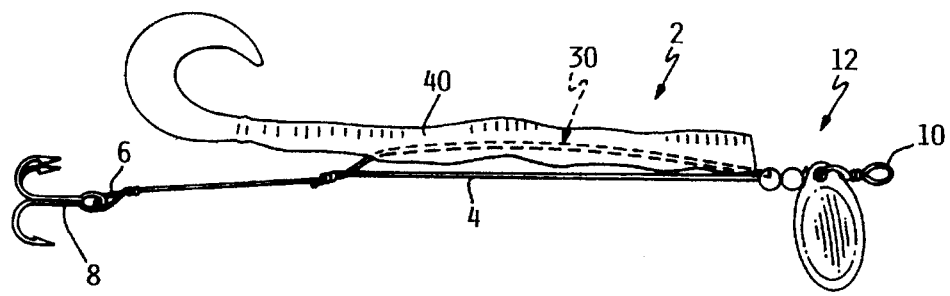
FIG. 1 is a side elevational view of a first embodiment of a fishing lure according to this invention, particularly illustrating the lure with the bait holding shank in engagement with a locking means formed by one of the beads for holding the bait in place on the lure.
Figure 2:
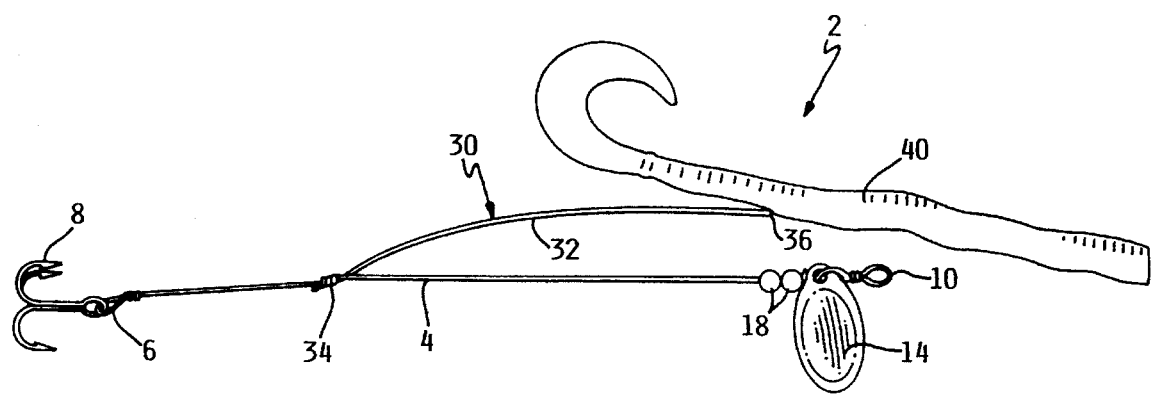
FIG. 2 is a side elevational view of a fishing lure according to this invention similar to FIG. 1, but particularly illustrating the lure with the bait holding shank having been released from the locking means formed by one of the beads for allowing the bait to be threaded or slid onto the bait holding shank.

The fishing lure 2 of this invention comprises a main shank 4 formed by a relatively thin wire several inches long. A first eyelet 6 is located at one end of main shank 4. A barbed hook 8 is suspended from first eyelet 6 to be attached in a swivel type connection to main shank 4. Thus, the orientation of hook 8 can change relative to main shank 4 and is not fixed relative thereto. For example, hook 8 could stream straight out from the rear of main shank 4 as shown in FIGS. 1 and 2, or could hang down, or could assume almost any other orientation as it passes through the water.

The other end of main shank 4 also includes a second eyelet 10 formed in any suitable manner, e.g. by twisting the end of the wire forming main shank 4 into a loop and then clinching this end to main shank 4 as is also done for first eyelet 8. This second eyelet 10 forms a means for attaching lure 2 to a fishing line. The fishing line (not shown) can simply be tied to eyelet 10. However, any other suitable connection means for attaching the fishing line to the end of main shank 4 that is opposite to hook 8 could be used in place of second eyelet 10.

A plurality of fish attracting elements, generally indicated as 12, are slidably and loosely received on main shank 4 near the second or line attaching eyelet 10. These elements 12 comprise a conventional blade or spoon 14 that is itself suspended from a ring 16 that is slidably received on main shank 4. The other elements 12 comprise a plurality of beads 18 each of which has a central longitudinal bore 20 through which main shank 4 passes. Preferably, bore 20 on those beads 18 that are furthest from second eyelet 10, namely those beads 18 that are the furthest to the interior of main shank 4, are considerably oversized relative to main shank 4 to leave a relatively large gap therebetween, for a purpose to be described later.

Figure 3:
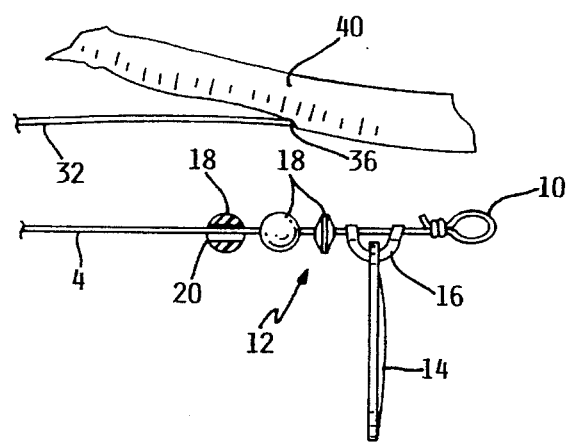
FIG. 3 is an enlarged side elevational view of the line attachment end of the lure shown in FIG. 1, particularly illustrating the beads and spoon placed near the line attachment eyelet.

Beads 18 comprise relatively solid members each of which has an unbroken peripheral exterior surface 22 except for the entrance and exit openings to bores 20. Thus, beads 18 do not form any projections or have any slots which might catch upon weeds or other obstructions in the water, but have a smooth exterior surface. The exterior shape of beads 18 can vary. At least some of beads 18 desirably have a spherical exterior shape as shown by the innermost two beads in FIG. 3. The next bead 18 could have a diamond shape on its exterior also as shown in FIG. 3. In any event, beads 18 are themselves also loosely and slidably received on main shank 4 to be able to rotate around main shank 4 as lure 2 passes through the water. Such bead movement, along with the associated movement that is possible from spoon 14, is thought to be important to attracting the attention of the fish to lure 2.

Referring now to FIG. 3, the fish attracting elements described above, comprising spoon 14 and beads 18, are shown slightly spread apart along the length of main shank 4 adjacent second eyelet 10. Spoon 14 is located nearest second eyelet 10, the diamond shaped bead 18 is next, and the two spherical beads 18 are placed in line last. The number of beads 18 could be varied as well as the order of the fish attracting elements 12 on main shank 4. For example, the positions of spoon 14 and the diamond shaped bead 18 could be reversed, or additional beads 18 could be placed between spoon 14 and second eyelet 10. However, it is important that the innermost one or two fish attracting elements comprise beads having the previously mentioned oversized bores 20.

During use of lure 2, the loose fish attracting elements 12 shown in FIG. 3 do not normally spread themselves out along main shank 4, but rather are forced against one another and against second eyelet 10 by a second bait holding shank 30. This bait holding shank 30 serves as a means for easily and quickly installing a bait of some type on lure 2. This can be done without any need for disassembling lure 2 or removing any of its components to thread some type of bait onto main shank 4 itself. Instead, the bait 40 is simply carried on the separate bait holding shank 30 which can be manipulated independently of main shank 4 in a bait installing operation. Such an operation is shown in and will be described with reference to FIGS. 1 and 2.

Bait holding shank 30 comprises a resilient wire 32 that is somewhat shorter than main shank 4. One end 34 of the resilient wire 32 is clinched to main shank 4 slightly inwardly of hook 8, e.g. by a half an inch or so. Normally, as shown in FIG. 2, wire 32 which forms bait holding shank 30 would stick out from main shank 4 to terminate in a free end 36 that is spaced from main shank 4. Preferably, wire 32 is a spring type wire which in an untensioned state would assume an orientation like that shown in FIG. 2. In this position, a bait 40, such as an artificial rubber or plastic worm, can be easily threaded or slid onto bait holding shank 30, as shown in FIG. 2, where bait 40 is illustrated just at the point where the insertion of bait 40 onto shank 30 is about to commence.

Once a bait 40 is installed on bait holding shank 30, wire 31 can be bent downwardly to force free end 36 of wire 32 towards main shank 4. This free end 36 is allowed to protrude slightly out of bait 40 after the bait installation process is completed. The free end 36 of wire 32 can then be easily and quickly secured to main shank 4 simply by slipping it into the oversized bores 20 on the last one or two of beads 18. See FIG. 1. When so secured, wire 31 will form an arc between its fixed rear connection point defined by rear end 34 and its releasable front connection point defined by free end 36 now received within at least one bead 18.

The degree or amount of this arc can be adjusted by controlling the length of wire 32. Slightly lengthening wire 32 will cause a larger arc and slightly decreasing wire 32 will cause a smaller arc. If bait 40 is threaded uniformly onto wire 32, i.e. wire 32 passes fairly close through the middle of bait 40, bait 40 will also assume the same arc shaped orientation over that portion connected to bait holding shank 30, though bait 40 could also have a flatter orientation as shown in FIG. 1 depending upon how it is threaded onto wire 32. In the case of a bait comprising a worm shaped member, an arc shaped orientation for a least a portion of its length may be desirable.

The advantages of lure 2 of this invention are apparent. It is extremely easy to attach bait 40 to lure 2. All the fisherman has to do is to slip bait holding shank 30 out of beads 18 into the orientation shown in FIG. 2, thread or slide a bait onto bait holding shank 30, bend bait holding shank 30 back down towards main shank 4, and to then slip free end 36 of bait holding shank 30 back into the bore 20 of at least the innermost bead 18 as shown in FIG. 1. This can be done in a matter of seconds without having to otherwise disassemble or remove components of lure 2.

Moreover, lure 2 is simple to manufacture and reliable during use. There is no need to place a separate hook or protrusion on main shank 4 for holding or securing bait holding shank 30, thus obviating this part and the labor needed to glue or solder this part to main shank 4. Instead, beads 18 themselves, and specifically the oversized bores 20 on the innermost beads, are used to releasably hold free end 36 of wire 32 to main shank 4. Moreover, beads 18 have unbroken outer surfaces that have no hooks, projections or slots. Thus, they do not have the same potential for catching on underwater obstructions as hook shaped latches or latches with slots. Accordingly, lure 2 of this invention will be more reliable during use.

Another advantage of lure 2 of this invention is that beads 18 which form the means for locking bait holding shank 30 to main shank 4 integrate themselves visually with the worm type bait 40 shown in the drawings. In other words, such beads resemble the segmented natural shape of a real worm and thus increase the attractiveness of bait 40 to the fish, even if the worm type bait itself is not so segmented.

Figure 4:
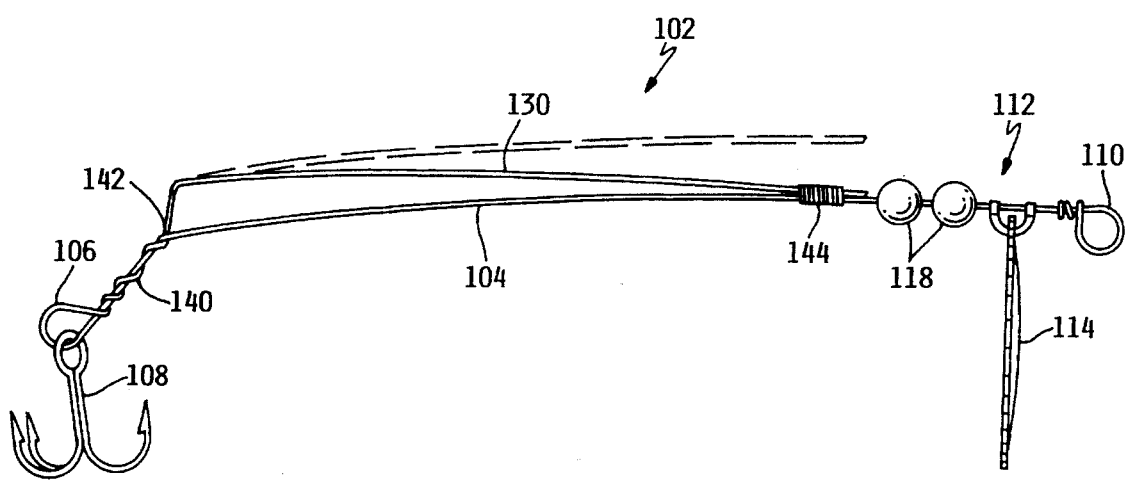
FIG. 4 is a side elevational view of a second embodiment of a fishing lure according to this invention, particularly illustrating the lure with the bait holding shank in engagement with a locking means formed a small, elongated spring for holding the bait in place on the lure.
Figure 5:
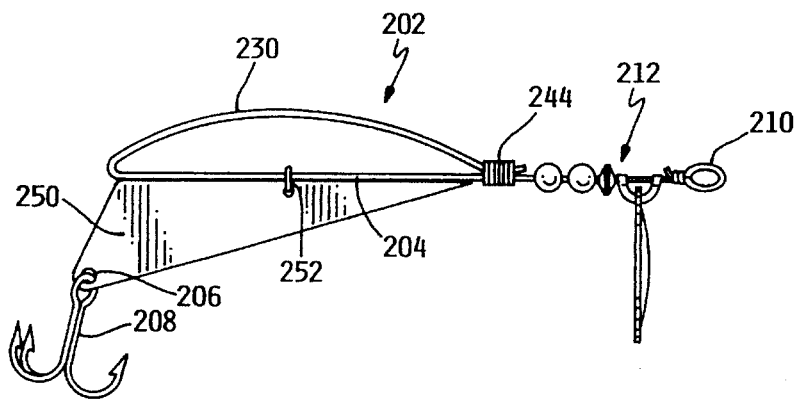
FIG. 5 is a side elevational view of a third embodiment of a fishing lure according to this invention, particularly illustrating the lure with a weight attached thereto.
Figure 6:
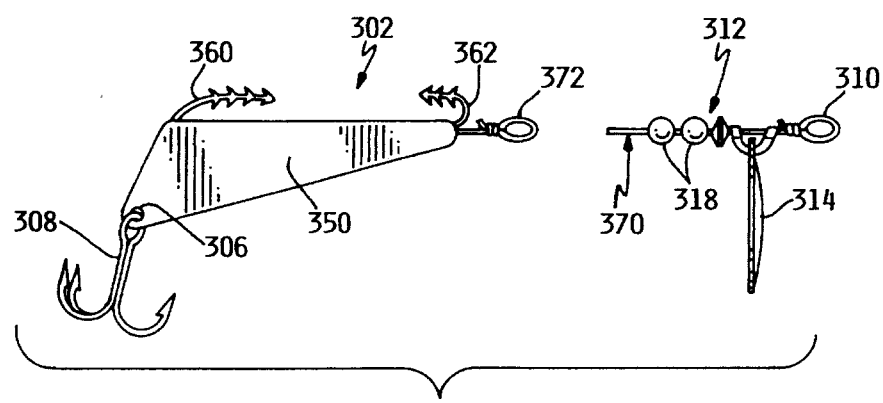
FIG. 6 is a side elevational view of a fourth embodiment of a fishing lure according to this invention, particularly illustrating the lure with a different type of locking means for attaching the bait to the lure and showing the fish attracting elements being contained on a releasably attached carrier.

A second embodiment of a fishing lure according to this invention is illustrated as 102 in FIG. 4. Each element of lure 102 that has a corresponding component in lure 2 will be referred to using the same reference numeral with a 100 prefix, e.g. lure 2 and lure 102.

In lure 102, the wire that forms main shank 104 is also used to form eyelet 106 and bait holding shank 130. This is achieved by taking a fairly long wire and bending it around itself approximately in the middle thereof to form an integral eyelet 106, by then wrapping the wire back around itself in a few turns 140, and by then bending the wire up as shown at 142 so that the rest of the wire is spaced above main shank 104 to form bait holding shank 130. As before, bait holding shank 130 is flexible or resilient to allow it to be bent down into engagement with main shank 130 (as shown in solid lines in FIG. 4) or to be spaced upwardly away from main shank 104 (as shown in phantom lines in FIG. 4). When spaced away from main shank 104, bait holding shank 130 is in a position to accept a bait thereon, preferably the artificial worm type bait 40, shown with respect to the embodiment of FIGS. 1–3.

In addition, lure 102 includes a different type of locking means for holding bait holding shank 130 in engagement with main shank 104. This locking means comprises a small, tightly wound spring 144 that is slidably received on main shank 104 adjacent the fish attracting elements 112. This spring 144 has an outer diameter that is preferably smaller than the outer diameter of beads 118, and an inner bore or diameter that is spaced away from main shank 104 by a small gap. Thus, the front end of bait holding shank 130 can be slipped into the gap between main shank 104 and the inner diameter of spring 144 with spring 144 actually being capable of being slid back down along the length of bait holding shank 130 by a small distance. Spring 144 is sufficiently tightly wound that its exterior surface is essentially smooth and thus not prone to catching on weeds or other underwater obstructions. Nonetheless, spring 144 firmly and reliably holds bait holding shank 130 in place.

A third embodiment of a fishing lure according to this invention is illustrated as 202 in FIG. 4. Each element of lure 102 that has a corresponding component in lure 2 or 102 will be referred to using the same reference numeral with a 200 prefix, e.g. lures 2 and lure 202.

Fishing lure 202 includes a planar steel or brass weight 250 which is secured to the underside of main shank 204. Weight 250 can be welded or soldered to the underside of main shank 204, and a small safety ring 252 extends through a hole in weight 250 and loops up and around main shank 204. Safety ring 252 will continue to keep weight 250 attached to main shank 204 even if the other connections therebetween, i.e. the welded or soldered connections, are somehow severed during use. Weight 250 will serve to keep lure 202 submerged during use. In addition, hook 208 can conveniently be attached to lure 202 simply by forming eyelet 206 as a hole in weight 250, rather than being a separate eyelet off the back end of main shank 204.

Finally, a fourth embodiment of a fishing lure according to this invention is illustrated as 302 in FIG. 4. Each element of lure 302 that has a corresponding component in lures 2, 102 or 202 will be referred to using the same reference numeral with a 300 prefix, e.g. lure 2 and lure 302.

In this embodiment, lure 302 includes a weight 350 that forms the body of the lure. In addition, lure 302 includes a different type of locking means for holding bait in place, namely forwardly and rearwardly extending barbed projections 360 and 362 at either end of the lure body. An artificial worm type bait (not shown) can be attached to lure 302 by pushing it first into one barbed projection 360 and then into the other barbed projection 362. Thus, bait can still be attached without having to disassembly the lure or any portion thereof. In addition, lure 302 need not be comprised of a solid body as shown, but could simply be formed as a thin wire shank with barbed projections 360 and 362 being secured to and extending upwardly from opposite ends of such shank.

Another difference in lure 302 is the placement of the fish attracting elements 312 on a separate wire carrier 370. The wire carrier 370 is then releasably secured to a front eyelet 372 on lure 302 in any suitable manner, e.g. by clinching the free end of wire carrier 370 in eyelet 372, by using another eyelet on the free end of wire carrier 370 that has a releasable clasp for clamping onto eyelet 372, etc. Placing fishing attracting elements 312 onto a releasably attached carrier 370 allows them to be selectively used. If they are not used, the fishing line can simply be attached to eyelet 372. However, they can be easily used and quickly attached to lure 302 whenever desired.

Various modifications of this invention will be apparent to those skilled in the art. Thus, the scope of the invention is to be limited only by the appended claims.

I claim:

1. A fishing lure on which bait can be quickly and easily installed, which comprises, (a) a main wire shank having a hook at a first end thereof and a line attachment means at the other end thereof;

(b) at least one fish attracting element carried on the main shank adjacent the line attachment means, wherein the fish attracting element comprises a bead having an oversize bore;

(c) a bait holding wire shank having one end attached to the main shank with the bait holding shank being flexible relative to the main shank and extending away from the main shank to terminate in a free end; and (d) a locking means on the main shank for releasably securing the free end of the bait holding shank, wherein the bait holding shank is released from the locking means to allow the bait to be threaded or slid onto the bait holding shank and thereafter can be flexed downwardly relative to the main shank to engage the free end of the bait holding shank with the locking means, wherein the locking means comprises a portion of the fish attracting element.

2. The lure of claim 1, wherein the fish attracting element comprises at least one bead loosely received on the main shank with the main shank passing through a bore in the bead, and wherein the bore is sufficiently larger than the main shank to form a gap therebetween into which the free end of the bait holding shank can be inserted, and wherein the resilience of the bait holding shank will keep the free end of the bait holding shank engaged within the bore during use of the lure.

3. The lure of claim 2, wherein the bead has a smooth, unbroken outer surface except for where the bore passes through the outer surface.

4. The lure of claim 3, wherein a plurality of beads are received on the main shank adjacent to the line attachment means.

5. The lure of claim 4, wherein the fish attracting element(s) further include a spoon received on the main shank between at least some of the beads and the line attachment means.

6. A fishing lure on which bait can be quickly and easily installed, which comprises, (a) a main wire shank having a hook at a first end thereof and a line attachment means at the other end thereof;

(b) a bait holding wire shank having one end attached to the main shank with the bait holding shank being flexible relative to the main shank and extending away from the main shank to terminate in a free end; and (c) a locking means on the main shank for releasably securing the free end of the bait holding shank, wherein the bait holding shank is released from the locking means to allow the bait to be threaded or slid onto the bait holding shank and thereafter can be flexed downwardly relative to the main shank to engage the free end Of the bait holding shank with the locking means, wherein the locking means comprises a small coil spring received on the main shank, the spring having a gap between its inner diameter and the main shank which is sufficient in size to receive the free end of the bait holding shank therein.

7. The lure of claim 6, wherein an artificial worm type bait is placed on the bait holding shank.

8. A fishing lure on which bait can be quickly and easily installed, which comprises, (a) a main shank having a hook at a first end thereof and an eyelet at the other end thereof;

(b) at least one locking member loosely and slidably received on the main shank, wherein the at least one locking member has a central bore for slidably mounting the locking member on the main shank;

(c) a bait holding shank pivotally attached to the main shank and extending towards said other end and the locking member to terminate in a free end, wherein the bait can be threaded or slid onto the bait holding shank whenever the bait holding shank is disposed in a first position with the free end thereof being spaced away from the main shank; and (d) wherein the bore in the at least one locking member is sufficiently oversized relative to the main shank to allow the free end of the bait holding shank to be received therein to lock the bait holding shank in place against the main shank after a bait has been installed on the bait holding shank.

9. The lure of claim 8, further including a spoon suspended from a mounting ring that is slidably received on the main shank, wherein the spoon is located between the eyelet and the at least one locking member.

10. The lure of claim 8, wherein the at least one locking member comprises at least one bead loosely and slidably received on the main shank adjacent the eyelet.

11. The lure of claim 10, wherein the bait holding shank comprises a resilient wire attached at one end to the main shank and having a length slightly greater than the distance between an attachment point of the bait holding shank to the main wire and an innermost bead such that the bait holding shank assumes an arcuate shape when the free end of the bait holding shank is received within the bore in the innermost bead.

12. The lure of claim 10, wherein the bead has a substantially smooth outer surface.

13. The lure of claim 10, wherein a plurality of beads are placed on the main shank in a side-by-side orientation.

14. The lure of claim 8, wherein the hook is suspended from another eyelet on the one end of the main shank.

15. The lure of claim 8, further including a weight secured to the main shank for weighting the lure.

16. The lure of claim 10, wherein the at least one locking member comprises a small spring loosely and slidably received on the main shank.

* * * * *